(12) United States Patent
Ohtomo et al.

(10) Patent No.: US 11,598,637 B2
(45) Date of Patent: Mar. 7, 2023

(54) SURVEYING INSTRUMENT

(71) Applicant: TOPCON Corporation, Tokyo-to (JP)

(72) Inventors: Fumio Ohtomo, Saitama (JP); Kaoru Kumagai, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 817 days.

(21) Appl. No.: 16/565,708

(22) Filed: Sep. 10, 2019

(65) Prior Publication Data

US 2020/0081266 A1 Mar. 12, 2020

(30) Foreign Application Priority Data

Sep. 12, 2018 (JP) ............................. JP2018-170278

(51) Int. Cl.
*G01C 15/00* (2006.01)
*G01C 11/06* (2006.01)
*G01C 1/02* (2006.01)

(52) U.S. Cl.
CPC ............ *G01C 15/006* (2013.01); *G01C 11/06* (2013.01); *G01C 1/02* (2013.01)

(58) Field of Classification Search
CPC .................................................. G01C 15/006
See application file for complete search history.

(56) References Cited

U.S. PATENT DOCUMENTS

| | | | | |
|---|---|---|---|---|
| 7,715,998 B2 * | 5/2010 | Hayashi | .................. | G01C 11/06 702/94 |
| 9,341,473 B2 * | 5/2016 | Zogg | .................... | G01C 15/002 |
| 10,895,632 B2 * | 1/2021 | Ohtomo | .................. | G01C 15/06 |
| 10,897,573 B2 * | 1/2021 | Toda | .................... | H04N 5/2628 |
| 10,921,430 B2 * | 2/2021 | Ohtomo | .................. | G01S 3/789 |
| 2016/0238385 A1 | 8/2016 | Ohtomo et al. | | |
| 2016/0238708 A1 | 8/2016 | Ohtomo et al. | | |
| 2016/0259039 A1 | 9/2016 | Ohtomo et al. | | |
| 2017/0131404 A1 | 5/2017 | Ohtomo et al. | | |
| 2017/0227357 A1 | 8/2017 | Ohtomo et al. | | |
| 2019/0360806 A1 * | 11/2019 | Ohtomo | ................ | G01S 7/4808 |

FOREIGN PATENT DOCUMENTS

| | | |
|---|---|---|
| JP | 2016-151422 A | 8/2016 |
| JP | 2016-151423 A | 8/2016 |
| JP | 2016-161411 A | 9/2016 |
| JP | 2017-90244 A | 5/2017 |
| JP | 2017-142081 A | 8/2017 |

* cited by examiner

*Primary Examiner* — Michael A Berns
(74) *Attorney, Agent, or Firm* — Nields, Lemack & Frame, LLC

(57) ABSTRACT

A surveying instrument comprises a distance measuring unit configured to measure a distance to an object to be measured, an optical axis deflector configured to deflect a distance measuring light, a measuring direction image pickup module configured to acquires an observation image and an arithmetic control module, wherein the arithmetic control module is configured to continuously cut out sighting images around a tracking point set in the observation image, to set a first cutout sighting image as a reference sighting image, to calculate a movement amount of the sighting image with respect to the reference sighting image by an image matching of the reference sighting image and the sighting image and to control the optical axis deflector based on a calculation result in such a manner that the tracking point is positioned at a center of the sighting image.

13 Claims, 10 Drawing Sheets

SURVEYING INSTRUMENT

BACKGROUND OF THE INVENTION

The present invention relates to a surveying instrument which enables to easily measure a target position.

Conventionally, in case of measuring an object to be measured by using a surveying instrument, the surveying instrument is installed on a tripod, and the object to be measured is measured by a non-prism distance measurement. However, the conventional surveying instrument need to be leveled at the time of an installation, and the surveying instrument need to be installed on a reference point. Therefore, it takes time and requires the skills for an installation work of the surveying instrument.

Further, as a surveying instrument recently proposed by the applicant, there is a surveying instrument disclosed in Japanese Patent Application Publication No. 2017-90244, for instance. The surveying instrument builds in a gimbal and can perform a two-dimensional scan. At the time of installing the surveying instrument, mounting the surveying instrument on a monopod and matching a lower end of the monopod to a reference point can suffice, and hence the surveying instrument can be easily installed.

However, since the above-described surveying instrument is supported by the monopod, the attitude is unstable, and it is difficult to keep irradiating a distance measuring light to a desired measuring position.

SUMMARY OF THE INVENTION

It is an object of the present invention to provide a surveying instrument which enables to perform a measurement while tracking a desired portion of an object to be measured.

To attain the object as described above, a surveying instrument according to the present invention comprises a monopod installed on a reference point, a surveying instrument main body which is provided at a known distance from a lower end of the monopod and at a known angle with respect to an axis of the monopod and has a reference optical axis and an operation panel which is provided on the monopod and has a display module, wherein the surveying instrument main body includes a distance measuring unit configured to irradiate a distance measuring light, to receive a reflected distance measuring light and to measure a distance to an object to be measured, an optical axis deflector configured to deflect the distance measuring light with respect to the reference optical axis, a measuring direction image pickup module which includes the object to be measured and is configured to acquire an observation image in a predetermined relationship with the reference optical axis and an arithmetic control module configured to make the distance measuring unit perform a distance measurement along a predetermined scan pattern, and wherein the arithmetic control module is configured to continuously cut out sighting images around a tracking point set in the observation image, to set a first cutout sighting image as a reference sighting image, to calculate a movement amount of the sighting image with respect to the reference sighting image by an image matching of the reference sighting image and the sighting image and to control the optical axis deflector based on a calculation result in such a manner that the tracking point is positioned at a center of the sighting image.

Further, in the surveying instrument according to a preferred embodiment, the arithmetic control module is configured to carry out a micro scan pattern around the tracking point each time the arithmetic control module controls the optical axis deflector in such a manner that the tracking point is positioned at the center of the sighting image.

Further, in the surveying instrument according to a preferred embodiment, the micro scan pattern is a minute circular scan pattern.

Further, in the surveying instrument according to a preferred embodiment, the arithmetic control module is configured to superimpose and average each of the sighting images based on a position of the tracking point in the sighting images and to create a fine image.

Further, in the surveying instrument according to a preferred embodiment, the arithmetic control module is configured to extract a plurality of ridge lines of the object to be measured by an image processing, to calculate tilts of the plurality of ridge lines, to calculate three-dimensional coordinates of intersections of the plurality of ridge lines and the micro scan pattern and to calculate three-dimensional coordinates of a corner part of the object to be measured based on the tilts of the plurality of ridge lines and the three-dimensional coordinates of the intersections.

Furthermore, the surveying instrument according to a preferred embodiment further comprises a lower image pickup module which is provided at a known position with respect to the surveying instrument main body and has a known relationship with respect to the reference optical axis, wherein the lower image pickup module has a lower image pickup optical axis directed downward and is configured to acquire a lower image including the lower end and a periphery of the monopod, and wherein the arithmetic control module is configured to obtain a displacement between the lower images of a pre-rotation and a post-rotation accompanying with a rotation around the axis of the monopod and to calculate a rotation angle of the surveying instrument main body around the reference point based on the displacement.

According to the present invention, the surveying instrument comprises a monopod installed on a reference point, a surveying instrument main body which is provided at a known distance from a lower end of the monopod and at a known angle with respect to an axis of the monopod and has a reference optical axis and an operation panel which is provided on the monopod and has a display module, wherein the surveying instrument main body includes a distance measuring unit configured to irradiate a distance measuring light, to receive a reflected distance measuring light and to measure a distance to an object to be measured, an optical axis deflector configured to deflect the distance measuring light with respect to the reference optical axis, a measuring direction image pickup module which includes the object to be measured and is configured to acquire an observation image in a predetermined relationship with the reference optical axis and an arithmetic control module configured to make the distance measuring unit perform a distance measurement along a predetermined scan pattern, and wherein the arithmetic control module is configured to continuously cut out sighting images around a tracking point set in the observation image, to set a first cutout sighting image as a reference sighting image, to calculate a movement amount of the sighting image with respect to the reference sighting image by an image matching of the reference sighting image and the sighting image and to control the optical axis deflector based on a calculation result in such a manner that the tracking point is positioned at a center of the sighting image. As a result, a measurement around the tracking point can be stably performed even in a case where a sighting direction of the surveying instrument main body changes during the measurement, and a measurement accuracy can be improved.

DETAILED DESCRIPTION OF THE PREFERRED EMBODIMENT

A description will be given on an embodiment of the present invention by referring to the attached drawings.

Figure 1:
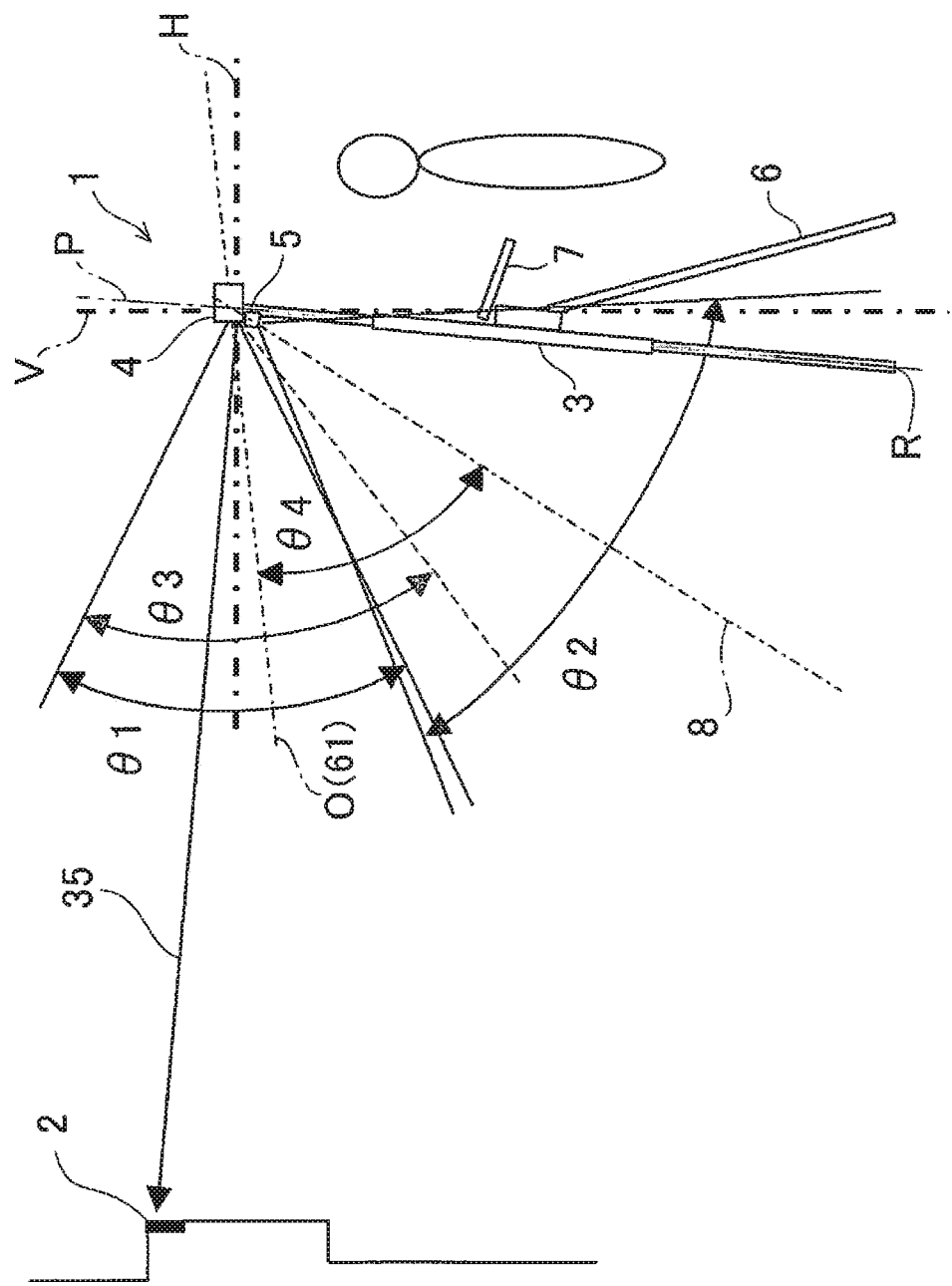
FIG. 1 is a schematical drawing to show an embodiment of the present invention.

FIG. 1 is a drawing to show an outline of the embodiment of the present invention, and in FIG. 1, a reference numeral 1 denotes a surveying instrument of a monopole support type and a reference numeral 2 denotes an object to be measured.

The surveying instrument 1 has mainly a monopod (monopole) 3, a surveying instrument main body 4 provided on an upper end of the monopod 3 and an operation panel 7, and the operation panel 7 is provided at an appropriate position of the monopod 3, at a position where a measurement worker can perform an operation easily in a standing attitude, for instance.

The operation panel 7 may be provided in a fixed manner with respect to the monopod 3 or may be attachable and detachable. It may be so configured that the operation panel 7 is capable of operating in a state where the operation panel 7 is mounted on the monopod 3. Further, it may be so configured that the operation panel 7 is separated from the monopod 3, and in a state of a single body, the operation panel 7 can be operated. The operation panel 7 and the surveying instrument main body 4 are capable of a data communication via various types of a communication means such as a wired and a wireless.

Further, a single auxiliary leg 6 is foldably mounted at a position below the operation panel 7 of the monopod 3.

A lower end of the monopod 3 has a sharp tip, and the lower end is installed at a reference point "R" (point which becomes a reference of a measurement). Further, a distance from the lower end of the monopod 3 to a machine center of the surveying instrument main body 4 (point which becomes a reference of the measurement in the surveying instrument main body 4) is already-known.

An optical system of the surveying instrument main body 4 has a reference optical axis "O" approximately extending in a horizontal direction, and the reference optical axis "O" is set so as to tilt downward by a predetermined angle with respect to a line orthogonal to an axis "P" of the monopod 3. Therefore, when the monopod 3 is set vertically, the reference optical axis "O" is tilted downward by the predetermined angle with respect to the horizontal.

The auxiliary leg 6 is foldably connected to the monopod 3 at an upper end of the auxiliary leg 6, and in a state where the auxiliary leg 6 is folded, the auxiliary leg 6 adheres closely to the monopod 3, and a lock mechanism, which holds the close contact state, is provided. Alternatively, in a simplified manner, a band (not shown) bundling the monopod 3 and the auxiliary leg 6 may be provided. In a state where the auxiliary leg 6 is folded, the worker can grip the monopod 3 and can perform a measurement.

The auxiliary leg 6 can rotate around the upper end at a predetermined angle and can be separated away from the monopod 3, and can be fixed at a separated position. When the auxiliary leg 6 is used, the surveying instrument main body 4 is supported by two points, which are the auxiliary leg 6 and the monopod 3, a support of the surveying instrument main body 4 is stabilized, and a stability of the measurement by the surveying instrument main body 4 is improved. It is to be noted that although a description has been given on a case where the number of the auxiliary leg 6 is one, the auxiliary leg 6 may be two. In this case, the monopod 3 can stand alone.

The surveying instrument main body 4 has a distance measuring unit 24 (to be described later) and a measuring direction image pickup module 21 (to be described later), and further a lower image pickup module 5, which is an external image pickup module, is provided on the surveying instrument main body 4. A reference optical axis of an optical system of the distance measuring unit 24 is the reference optical axis "O". An optical axis of the measuring direction image pickup module 21 (hereinafter a first image pickup optical axis 61) is tilted upward by a predetermined angle (60, for instance) with respect to the reference optical axis "O", and a distance and a positional relationship between the optical axis of the measuring direction image pickup module 21 and an optical axis of the distance measuring unit 24 are already-known. The distance measuring unit 24 and the measuring direction image pickup module 21 are accommodated in a casing of the surveying instrument main body 4.

The lower image pickup module 5 has an image pickup element such as a CCD and a CMOS, and an image pickup device capable of acquiring a digital image is used as the lower image pickup module 5. Further, a position of a pixel in the image pickup element can be detected with reference to a lower image pickup optical axis of the lower image pickup module 5 (hereinafter a second image pickup optical axis 8). As the lower image pickup module 5, a commercial digital camera can be used, for instance.

The lower image pickup module 5 is fixed to the casing of the surveying instrument main body 4, and the lower image pickup module 5 (that is, an image forming position of the lower image pickup module 5) is provided at a known position (distance) with respect to the machine center of the surveying instrument main body 4. The second image pickup optical axis 8 is directed downward and set at the predetermined known angle with respect to the reference optical axis "O", and the second image pickup optical axis 8 and the reference optical axis "O" have a known relationship (distance). It is to be noted that the lower image pickup module 5 may be accommodated in the casing and may be integrated with the surveying instrument main body 4.

A field angle of the measuring direction image pickup module 21 is "θ1", the field angle of the lower image pickup module 5 is "θ2", and "θ1" and "θ2" may be equal or may be different. Further, the field angle of the measuring direction image pickup module 21 and the field angle of the lower image pickup module 5 do not have to overlap each other, but they preferably overlap each other by a predetermined amount. Further, the field angle of the lower image pickup module 5 and the direction of the second image pickup optical axis 8 are set so that the lower end of the monopod 3 is included in an image.

A description will be given on an outline configuration of the surveying instrument main body 4 by referring to FIG. 2.

The surveying instrument main body 4 includes a distance measuring light projecting module 11, a light receiving module 12, a distance measurement calculating module 13, an arithmetic control module 14, a first storage module 15, an image pickup control module 16, an image processing module 17, a first communication module 18, an optical axis deflector 19, an attitude detector 20, the measuring direction image pickup module 21, a projecting direction detecting module 22 and a motor driver 23, and they are accommodated in a casing 25 and integrated. It is to be noted that the distance measuring light projecting module 11, the light receiving module 12, the distance measurement calculating module 13, the optical axis deflector 19 and the like make up a distance measuring unit 24, and the distance measuring unit 24 functions as an electronic distance meter.

The distance measuring light projecting module 11 has a projection optical axis 26, and a light emitter 27 such as a laser diode (LD), for instance, as a distance measuring light source is provided on the projection optical axis 26. Further, a projecting lens 28 is provided on the projection optical axis 26. Furthermore, the projection optical axis 26 is deflected so as to coincide with a light receiving optical axis 31 (to be described later) by a first reflection mirror 29 as a deflecting optical component provided on the projection optical axis 26 and a second reflection mirror 32 as a deflecting optical component provided on the light receiving optical axis 31. The first reflection mirror 29 and the second reflection mirror 32 make up a projection optical axis deflector.

A CPU specialized for this instrument or a general-purpose CPU is used as the distance measurement calculating module 13, and the distance measurement calculating module 13 executes a program (to be described later) stored in the first storage module 15 and performs a distance measurement or a control. It is to be noted that a part of the functions of the arithmetic control module 14 may be assigned as the distance measurement calculating module 13. The distance measurement calculating module 13 makes the light emitter 27 emit, and the light emitter 27 emits a laser beam. The distance measuring light projecting module 11 projects the laser beam emitted from the light emitter 27 as a distance measuring light 33. It is to be noted that, as the laser beam, any one of a continuous light or a pulsed light or an intermittent modulated light disclosed in Japanese Patent Application Publication No. 2016-161411 may be used.

A description will be given on the light receiving module 12. A reflected distance measuring light 34 from an object to be measured 2 enters into the light receiving module 12. The light receiving module 12 has the light receiving optical axis 31, and the projection optical axis 26 deflected by the first reflection mirror 29 and the second reflection mirror 32 coincides with the light receiving optical axis 31. It is to be noted that an axis of a state where the projection optical axis 26 coincides with the light receiving optical axis 31 is a distance measuring optical axis 35.

The optical axis deflector 19 is disposed on the reference optical axis "O". A straight optical axis transmitted through a center of the optical axis deflector 19 is the reference optical axis "O". The reference optical axis "O" coincides with the projection optical axis 26, the light receiving optical axis 31 or the distance measuring optical axis 35 when they are not deflected by the optical axis deflector 19.

The reflected distance measuring light 34 is transmitted through the optical axis deflector 19 and is incident onto the light receiving optical axis 31. Further, a focusing lens 38 is disposed on the light receiving optical axis 31. Further, a photodetector 39 such as a photodiode (PD) or an avalanche photodiode (APD) is provided on the light receiving optical axis 31. The focusing lens 38 focuses the reflected distance measuring light 34 on the photodetector 39. The photodetector 39 receives the reflected distance measuring light 34 and produces a photodetecting signal. The photodetecting signal is inputted into the distance measurement calculating module 13, and the distance measurement calculating module 13 calculates a round-trip time of the distance measuring light based on the photodetecting signal and performs the distance measurement to the object to be measured 2 based on the round-trip time and the light velocity. Further, the photodetecting signal includes an information of a light receiving intensity of when the reflected distance measuring light 34 is received, and the distance measurement calculating module 13 calculates a reflection intensity from the object to be measured 2.

The first communication module 18 transmits image data acquired by the measuring direction image pickup module 21, image data processed by the image processing module 17 and distance measurement data acquired by the distance measuring unit 24 to the operation panel 7 and receives an operation command from the operation panel 7. The first communication module 18 performs the data communication with a second communication module 67 which will be described later by a required communication means such as a wired and a wireless.

As the first storage module 15, a magnetic recording means such as an HD, an FD and the like, an optical recording means such as a CD, a DVD and the like or a semiconductor recording means such as a memory card, a USB memory and the like is used. In the first storage module 15, various types of programs are stored. These programs include: an image pickup control program, an image processing program, a display program, a communication program, an operation command creating program, a tilt angle calculation program for calculating a tilt angle and a tilting direction of the monopod 3 based on an attitude detection result from the attitude detector 20 and for calculating a vertical component of the tilt angle (tilt angle of the monopod 3 in a front-and-rear direction with respect to the object to be measured 2) and a horizontal component of the tilt angle (tilt angle of the monopod 3 in a left-and-right direction with respect to the object to be measured 2), a measurement program for carrying out the distance measurement, a deflection control program for controlling a deflecting operation of the optical axis deflector 19, a tracking program for tracking a tracking point (to be described later), an integration image creating program for creating an integration image (to be described later), a calculation program for calculating a ridge line and a corner part of the object to be measured 2, a calculation program for executing various types of calculations and other programs. Further, various types of data, such as the distance measurement data, angle measurement data and the image data are stored in the first storage module 15.

A CPU specialized for this instrument or a general-purpose CPU is used as the arithmetic control module 14. According to an operating state of the surveying instrument main body 4, the arithmetic control module 14 develops and executes the various types of programs, carries out a control of the distance measuring light projecting module 11, a control of the light receiving module 12, a control of the distance measurement calculating module 13, a control of the measuring direction image pickup module 21 and the like, and performs the distance measurement by the surveying instrument main body 4.

A detailed description will be given on the optical axis deflector 19.

The optical axis deflector 19 is constituted by a pair of optical prisms 41 and 42. The optical prisms 41 and 42 have a disk shape with the same diameter, respectively, are arranged concentrically on the distance measuring optical axis 35 while crossing the distance measuring optical axis 35 at a right angle, and are arranged in parallel at a predetermined interval. The optical prism 41 is formed from an optical glass and has three triangular prisms arranged in parallel. Similarly, the optical prism 42 is also formed from the optical glass and has three triangular prisms arranged in parallel. It is to be noted that the triangular prisms which constitute the optical prism 41 and the triangular prisms which constitute the optical prism 42 all have optical characteristics of the same deflection angle.

A width and a shape of each of the triangular prisms may be the same or may be different. It is to be noted that the widths of the triangular prisms positioned at a center are larger than a beam diameter of the distance measuring light 33, and the distance measuring light 33 is adapted to transmit only the triangular prisms positioned at the center. The triangular prisms positioned other than at the center may be constituted by a plurality of small triangular prisms.

Further, the triangular prisms at the center may be made of an optical glass, and the triangular prisms other than at the center may be made of an optical plastic. That is because a distance from the optical axis deflector 19 to the object to be measured 2 is large, optical characteristics of the triangular prisms at the center require an accuracy, but on the other hand, a distance from each triangular prism other than at the center to the photodetector 39 is small, and highly accurate optical characteristics are not required.

A central part of the optical axis deflector 19 (triangular prisms at the center) is a distance measuring light deflector which is a first optical axis deflector through which the distance measuring light 33 is transmitted and is projected. A portion excluding the central part of the optical axis deflector 19 (both end portions of the triangular prisms at the center and the triangular prisms other than at the center) is a reflected distance measuring light deflector which is a second optical axis deflector through which the reflected distance measuring light 34 is transmitted and enters.

The optical prisms 41 and 42 are arranged rotatably individually and independently around the reference optical axis "O", respectively. The optical prisms 41 and 42 are controlled independently by the arithmetic control module 14 regarding a rotating direction, a rotation amount and a rotating speed. Thereby, the optical prisms 41 and 42 deflect the projection optical axis 26 of the projected measuring light 33 in an arbitrary direction and also deflect the light receiving optical axis 31 of the received reflected distance measuring light 34 in parallel with the projection optical axis 26.

Further, the optical prisms 41 and 42 are continuously driven and continuously deflected while continuously irradiating the distance measuring light 33. Thereby, the distance measuring light 33 can be scanned in a predetermined pattern.

Outer shapes of the optical prisms 41 and 42 are circular around the distance measuring optical axis 35 (reference optical axis "O"), respectively, and diameters of the optical prisms 41 and 42 are set so that a sufficient light amount can be obtained by considering a spread of the reflected distance measuring light 34.

A ring gear 45 is fitted on an outer periphery of the optical prism 41, and a ring gear 46 is fitted on an outer periphery of the optical prism 42.

A driving gear 47 is meshed with the ring gear 45, and the driving gear 47 is fixed to an output shaft of a motor 48. Similarly, a driving gear 49 is meshed with the ring gear 46, and the driving gear 49 is fixed to an output shaft of a motor 50. The motors 48 and 50 are electrically connected to the motor driver 23.

As the motors 48 and 50, motors which are capable of detecting the rotation angle are used, or motors which rotate corresponding to a driving input value such as a pulse motor, for instance, are used. Alternatively, a rotation angle detector which detects rotation amounts (rotation angles) of the motors such as an encoder, for instance, may be used, and the rotation amounts of the motors 48 and 50 may be detected by the rotation angle detector. The rotation amounts of the motors 48 and 50 are detected, respectively, and the motors 48 and 50 are individually controlled by the motor driver 23.

Further, rotation angles of the prisms 41 and 42 are detected via the rotation amounts of the motors 48 and 50, that is, rotation amounts of the driving gears 47 and 49. It is to be noted that the encoder may be attached directly to the ring gears 45 and 46, respectively, so that the rotation angles of the ring gears 45 and 46 are directly detected by the encoder.

Here, a deflection angle of the optical axis deflector 19 is smaller than the rotation angles of the optical prisms 41 and 42 (for instance, a rotation angle for achieving the deflection angle ±10° is ±40°), and the optical axis deflector 19 can deflect the distance measuring light 33 highly accurately.

The driving gears 47 and 49 and the motors 48 and 50 are provided at positions not interfering with the distance measuring light projecting module 11 such as at lower positions of the ring gears 45 and 46, for instance.

The projecting lens 28, the first reflection mirror 29, the second reflection mirror 32, the distance measuring light deflector and the like make up a projection optical system. Further, the reflected distance measuring light deflector, the focusing lens 38 and the like make up a light receiving optical system.

The distance measurement calculating module 13 controls the light emitter 27 and makes the light emitter 27 pulse-emit or burst-emit (intermittently emit) the laser beam as the distance measuring light 33. The projection optical axis 26 (that is, the distance measuring optical axis 35) is deflected by the distance measuring light deflector so that the distance measuring light 33 is directed toward the object to be measured 2. The distance measurement is performed in a state where the distance measuring optical axis 35 sights the object to be measured 2.

The reflected distance measuring light 34 as reflected from the object to be measured 2 is incident through the reflected distance measuring light deflector and the focusing lens 38, and the reflected distance measuring light 34 is received by the photodetector 39. The photodetector 39 sends out the photodetecting signal to the distance measurement calculating module 13, and the distance measurement calculating module 13 performs the distance measurement of a measuring point (point irradiated by the distance measuring light) for each pulsed light based on the photodetecting signal from the photodetector 39, and the distance measurement data is stored in the first storage module 15.

The projecting direction detecting module 22 counts driving pulses inputted into the motors 48 and 50 and detects the rotation angles of the motors 48 and 50. Alternatively, the projecting direction detecting module 22 detects the rotation angles of the motors 48 and 50 based on a signal from the encoder. Further, the projecting direction detecting module 22 calculates rotational positions of the optical prisms 41 and 42 based on the rotation angles of the motors 48 and 50.

Further, the projecting direction detecting module 22 calculates a deflection angle and a projecting direction (deflecting direction) of the distance measuring light 33 with respect to the reference optical axis "O" for each pulsed light based on refractive indexes of the optical prisms 41 and 42, the rotational position of when the optical prisms 41 and 42 are integrated and a relative rotation angle between the both optical prisms 41 and 42 in real time. A calculation result (angle measurement result) is associated with the distance measurement result and is inputted into the arithmetic control module 14. It is to be noted that in a case where the distance measuring light 33 is burst-emitted, the distance measurement is performed for each intermittent distance measuring light.

The arithmetic control module 14 executes a program stored in the first storage module 15 and executes various types of calculations, a processing such as a creation of three-dimensional data and various types of controls. By controlling the rotating directions and the rotating speeds of the motors 48 and 50 and a rotation ratio between the motors 48 and 50, the arithmetic control module 14 controls a relative rotation and an entire rotation of the optical prisms 41 and 42 and controls a deflecting action by the optical axis deflector 19. Further, the arithmetic control module 14 calculates a horizontal angle and a vertical angle of the measuring point with respect to the reference optical axis "O" based on the deflection angle and the projecting direction of the distance measuring light 33. Further, the arithmetic control module 14 associates the horizontal angle and the vertical angle regarding the measuring point with the distance measurement data and can acquire three-dimensional data of the measuring point. Thus, the surveying instrument main body 4 functions as a total station.

Further, a scan can be performed in an arbitrary pattern within a range of a maximum deflection angle of the optical axis deflector 19 as described later.

Next, a description will be given on the attitude detector 20. The attitude detector 20 detects a tilt angle with respect to the horizontal or the vertical of the measuring instrument main body 4, and the detection result is inputted to the arithmetic control module 14. It is to be noted that as the attitude detector 20, an attitude detector disclosed in Japanese Patent Application Publication No. 2016-151423 can be used.

The attitude detector 20 will be described in brief. The attitude detector 20 has a frame 54. The frame 54 is fixed to the casing 25 or fixed to a structural component and is integrated with the surveying instrument main body 4.

A sensor block 55 is mounted on the frame 54 via a gimbal. The sensor block 55 is rotatable by 360° or over 360° in two directions around two axes crossing each other at a right angle, respectively.

A first tilt sensor 56 and a second tilt sensor 57 are mounted on the sensor block 55. The first tilt sensor 56 is a sensor which detects the horizontal with high accuracy, for instance, a tilt detector which makes a detection light enter a horizontal liquid surface, and detects the horizontal according to a change of a reflection angle of a reflected light or an air bubble tube which detects the tilt according to a positional change of sealed air bubbles. Further, the second tilt sensor 57 is a sensor which detects a tilt change with high responsiveness, for instance an acceleration sensor.

Each relative rotation angle of the two axes of the sensor block 55 with respect to the frame 54 are configured to be detected by encoders 58 and 59, respectively.

Further, motors (not shown) which rotate the sensor block 55 in order to maintain the sensor block 55 horizontally are provided in relation with the two axes, respectively. The motors are controlled by the arithmetic control module 14 so that the sensor block 55 is maintained horizontally based on detection results from the first tilt sensor 56 and the second tilt sensor 57.

In a case where the sensor block 55 is tilted (in a case where the surveying instrument main body 4 is tilted), the relative rotation angle of each axial direction of the frame 54 with respect to the sensor block 55 (horizontal) is detected by the encoders 58 and 59, respectively. Based on the detection results of the encoders 58 and 59, the tilt angles of the surveying instrument main body 4 with respect to the two axes are detected, and the tilting direction of the surveying instrument main body 4 is detected by synthesizing the tilts of the two axes.

The sensor block 55 is rotatable by 360° or over 360° with respect to the two axes and hence, whatever the attitude detector 20 takes any attitude or even if the attitude detector 20 is inverted upside down, for instance, the attitude detector 20 is capable of an attitude detection (the tilt angle and the tilting direction with respect to the horizontal) in all the directions.

In the attitude detection, in a case where high responsiveness is required, the attitude detection and an attitude control are performed based on the detection result of the second tilt sensor 57, but the second tilt sensor 57 has a detection accuracy poorer than the first tilt sensor 56 in general.

The attitude detector 20 includes the first tilt sensor 56 with high accuracy and the second tilt sensor 57 with high responsiveness. Thereby, it is possible to perform the attitude control based on the detection result of the second tilt sensor 57 and further, to perform the attitude detection with high accuracy by the first tilt sensor 56.

The detection result of the second tilt sensor 57 can be calibrated based on the detection result of the first tilt sensor 56. That is, if a deviation is caused between values of the encoders 58 and 59 of when the first tilt sensor 56 detects the horizontal, that is, an actual tilt angle and the tilt angle detected by the second tilt sensor 57, the tilt angle of the second tilt sensor 57 can be calibrated based on the deviation.

Therefore, if the relationship between a tilt angle detected by the second tilt sensor 57 and a tilt angle, which is obtained based on the horizontal detection by the first tilt sensor 56 and the detection results of the encoders 58 and 59, is obtained in advance, the arithmetic control module 14 can calibrate the tilt angle detected by the second tilt sensor 57, and an accuracy of the attitude detection with high responsiveness by the second tilt sensor 57 can be improved based on this calibration. In a state where there is a small environmental change (temperature or the like), the tilt detection may be performed based on the detection result of the second tilt sensor 57 and a correction value.

The arithmetic control module 14 controls the motors based on the signal from the second tilt sensor 57 when a tilt fluctuation is large and when the tilt change is rapid. Further, the arithmetic control module 14 controls the motors based on the signal from the first tilt sensor 56 when the tilt fluctuation is small and when the tilt change is mild, that is, in a state where the first tilt sensor 56 is capable of following up. It is to be noted that by calibrating the tilt angle detected by the second tilt sensor 57 at all times, the attitude detection by the attitude detector 20 may be performed based on the detection result from the second tilt sensor 57.

In the first storage module 15, comparison data indicating a comparison result between the detection result of the first tilt sensor 56 and the detection result of the second tilt sensor 57 is stored. The detection result by the second tilt sensor 57 is calibrated based on the signal from the first tilt sensor 56. By this calibration, the detection result by the second tilt sensor 57 can be improved to the detection accuracy of the first tilt sensor 56. Thus, in the attitude detection by the attitude detector 20, high responsiveness can be realized while high accuracy is maintained.

The arithmetic control module 14 calculates an inclination angle of the monopod 3 in the front-and-rear direction (inclination angle in an approaching and separating direction with respect to the object to be measured 2) and an inclination angle of the monopod 3 in the left-and-right direction based on the detection result of the attitude detector 20. The inclination angle in the front-and-rear direction appears as a tilt angle of the reference optical axis "O" with respect to the horizontal, and the inclination angle in the left-and-right direction appears as an inclination (rotation) of an image acquired by the measuring direction image pickup module 21.

The arithmetic control module 14 calculates a tilt angle of the distance measuring optical axis 35 with respect to the horizontal based on the inclination angles and the deflection angle by the optical axis deflector 19. Further, based on the inclination of the image, an inclination of an image displayed on the display module 68 (to be described later) is corrected and displayed as a vertical image.

The measuring direction image pickup module 21 has the first image pickup optical axis 61 in parallel with the reference optical axis "O" of the surveying instrument main body 4 and an image pickup lens 62 arranged on the first image pickup optical axis 61. The measuring direction image pickup module 21 is a camera having a field angle 50° to 60°, for instance, substantially equal to a maximum deflection angle "θ/2" (±30°, for instance) of the optical prisms 41 and 42. The relationship among the first image pickup optical axis 61, the projection optical axis 26 and the reference optical axis "O" is already-known, and the distance between each of the optical axes has a known value.

Further, the measuring direction image pickup module 21 can acquire a still image, a continuous image or a video image in real time. The image acquired by the measuring direction image pickup module 21 is transmitted to the operation panel 7. In the present embodiment, the image is displayed on the display module 68 (see FIG. 5) of the operation panel 7 as an observation image 81 (see FIG. 3) which is a still image, and the worker can observe the observation image 81 displayed on the display module 68 and carry out a measurement work. A center of the observation image 81 coincides with the first image pickup optical axis 61, and the reference optical axis "O" is positioned at a position which deviates from the center of the observation image 81 at a predetermined field angle based on a known relationship between the reference optical axis "O" and the first image pickup optical axis 61.

The image pickup control module 16 controls an image pickup of the measuring direction image pickup module 21. In a case where the measuring direction image pickup module 21 picks up the video image or the continuous image, the image pickup control module 16 synchronizes a timing of acquiring a frame image constituting the video image or the continuous image with a timing of scanning and of performing the distance measurement by the surveying instrument main body 4 (timing of measuring a distance per a pulsed laser beam). Further, in a case where the measuring direction image pickup module 21 acquires the observation image 81, the image pickup control module 16 synchronize a timing of acquiring the observation image 81 and a sighting image 82 (to be described later) with the timing of scanning by the surveying instrument main body 4. The arithmetic control module 14 also performs associating the image with the measurement data (distance measurement data, angle measurement data). Further, the image pickup control module 16 performs a synchronization control of the image pickup timing between the measuring direction image pickup module 21 and the lower image pickup module 5 via the first communication module 18 and a second communication module 67 (see FIG. 5).

An image pickup element 63 of the measuring direction image pickup module 21 is a CCD or a CMOS sensor which is an aggregate of pixels, and each pixel can specify a position on the image pickup element 63. Each pixel has pixel coordinates in a coordinate system with the first image pickup optical axis 61 as an origin, for instance. The photodetecting signal from each pixel includes an information of the pixel coordinates. Therefore, a position of each pixel on the image pickup element 63 is specified by the pixel coordinates included in the photodetecting signal. Further, since the relationship (distance) between the first image pickup optical axis 61 and the reference optical axis "O" is already-known, a mutual association between the measuring position by the distance measuring unit 24 and the position (pixel) on the image pickup element 63 can be made. An image signal outputted from the image pickup element 63 is inputted into the image processing module 17 via the image pickup control module 16.

A description will be given on a deflecting action and a scanning action of the optical axis deflector 19.

In a state where the triangular prisms of the optical prism 41 and the triangular prisms of the optical prism 42 are positioned in the same direction, a maximum deflection angle (for instance, 30°) can be obtained. In a state where either one of the optical prisms 41 and 42 is positioned in a position where either one of the optical prisms is rotated by 180° with respect to the other of the optical prism, mutual optical actions of the optical prisms 41 and 42 are offset, and the deflection angle becomes 0°. In this state, a minimum deflection angle can be obtained. Therefore, the optical axis of the laser beam (the distance measuring optical axis 35)

projected and received via the optical prisms 41 and 42 coincides with the reference optical axis "O".

The distance measuring light 33 is emitted from the light emitter 27, and the distance measuring light 33 is made to parallel fluxes by the projecting lens 28. The distance measuring light 33 is transmitted through the distance measuring light deflector and is projected toward the object to be measured 2. Here, since the distance measuring light 33 is transmitted through the distance measuring light deflector, the distance measuring light 33 is deflected in a required direction by the triangular prisms at the center and projected.

Here, the distance measuring light 33 is all transmitted through the triangular prisms at the center and affected by an optical action of the triangular prisms at the center, but since the optical action is provided from a single optical component, a luminous flux is not disordered, and a deflection accuracy is high. Further, since the optical glass is used as the triangular prisms at the center, the deflection accuracy can be further increased.

The reflected distance measuring light 34 reflected by the object to be measured 2 transmits through the reflected distance measuring light deflector and enters and is focused on the photodetector 39 by the focusing lens 38.

Since the reflected distance measuring light 34 is transmitted through the reflected distance measuring light deflector, an optical axis of the reflected distance measuring light 34 is deflected by the triangular prisms other than at the center so as to coincide with the light receiving optical axis 31.

Here, for the triangular prisms other than at the center used as the reflected distance measuring light deflector, the optical plastic may be used, or a Fresnel prism which is an aggregate of minute triangular prisms may be used. Since a distance between the optical axis deflector 19 and the photodetector 39 is short, a high accuracy is not required in the reflected distance measuring light deflector.

The deflecting direction and the deflection angle of the distance measuring light 33 as projected can be arbitrarily changed by the combination of the rotational positions of the optical prism 41 and the optical prism 42.

Figure 2:
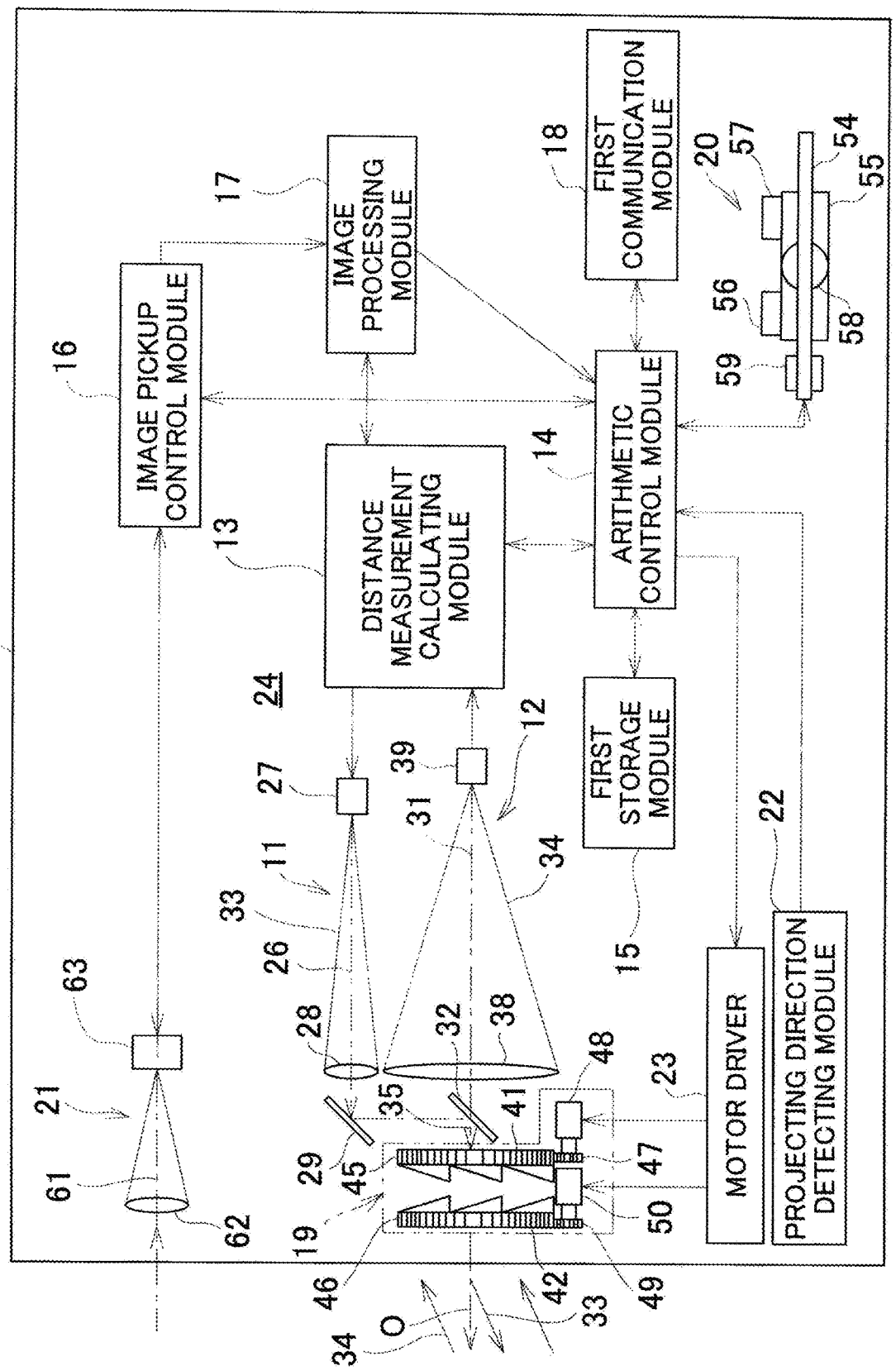
FIG. 2 is a schematical block diagram to show a surveying instrument main body.

Further, when the optical prism 41 and the optical prism 42 are integrally rotated by the motors 48 and 50 in a state where the positional relationship between the optical prism 41 and the optical prism 42 is fixed (in a state where the deflection angle as obtained by the optical prism 41 and the optical prism 42 is fixed), a locus drawn by the distance measuring light 33 as transmitted through the distance measuring light deflector becomes a circle around the reference optical axis "O" (see FIG. 2).

Therefore, if the optical axis deflector 19 is rotated while the laser beam is emitted from the light emitter 27, the distance measuring light 33 can be scanned with a circular locus. It is needless to say that the reflected distance measuring light deflector is integrally rotated with the distance measuring light deflector.

Figure 4A:
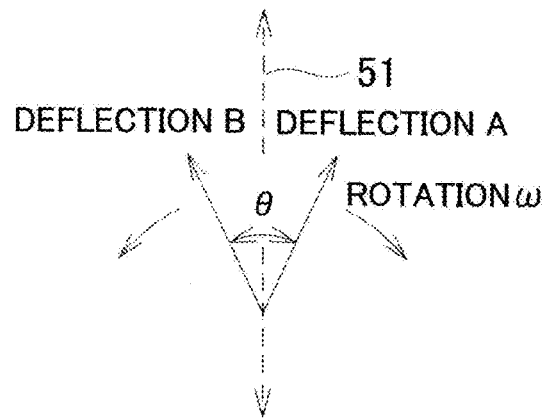
FIG. 4A and FIG. 4B are explanatory drawings of an action of an optical axis deflector.

As shown in FIG. 4A, assuming that the deflecting direction of the optical axis deflected by the optical prism 41 is a deflection "A" and the deflecting direction of the optical axis deflected by the optical prism 42 is a deflection "B", the deflection of the optical axis by the optical prisms 41 and 42 becomes a synthetic deflection "C" as an angular difference "e" between the optical prisms 41 and 42.

Therefore, when the optical prism 41 and the optical prism 42 are reversely rotated at an equal speed, the distance measuring light 33 is reciprocally scanned with a linear locus 51 in a direction of the synthetic deflection "C".

Figure 4B:
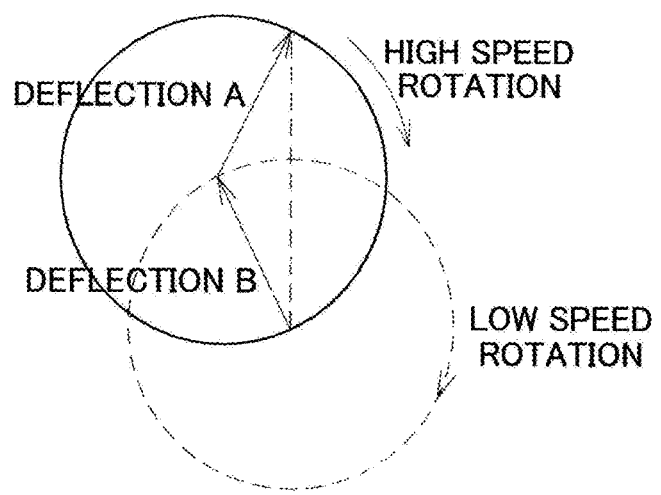

Further, as shown in FIG. 4B, when the optical prism 42 is rotated at a rotating speed lower than a rotating speed of the optical prism 41, the distance measuring light 33 is rotated while the angular difference θ is gradually increased. Therefore, a scan locus of the distance measuring light 33 becomes spiral.

Further, by individually controlling the rotating directions and the rotating speeds of the optical prism 41 and the optical prism 42, various two-dimensional scan patterns of the scan locus of the distance measuring light 33 around the reference optical axis "O" can be obtained.

Figure 3:
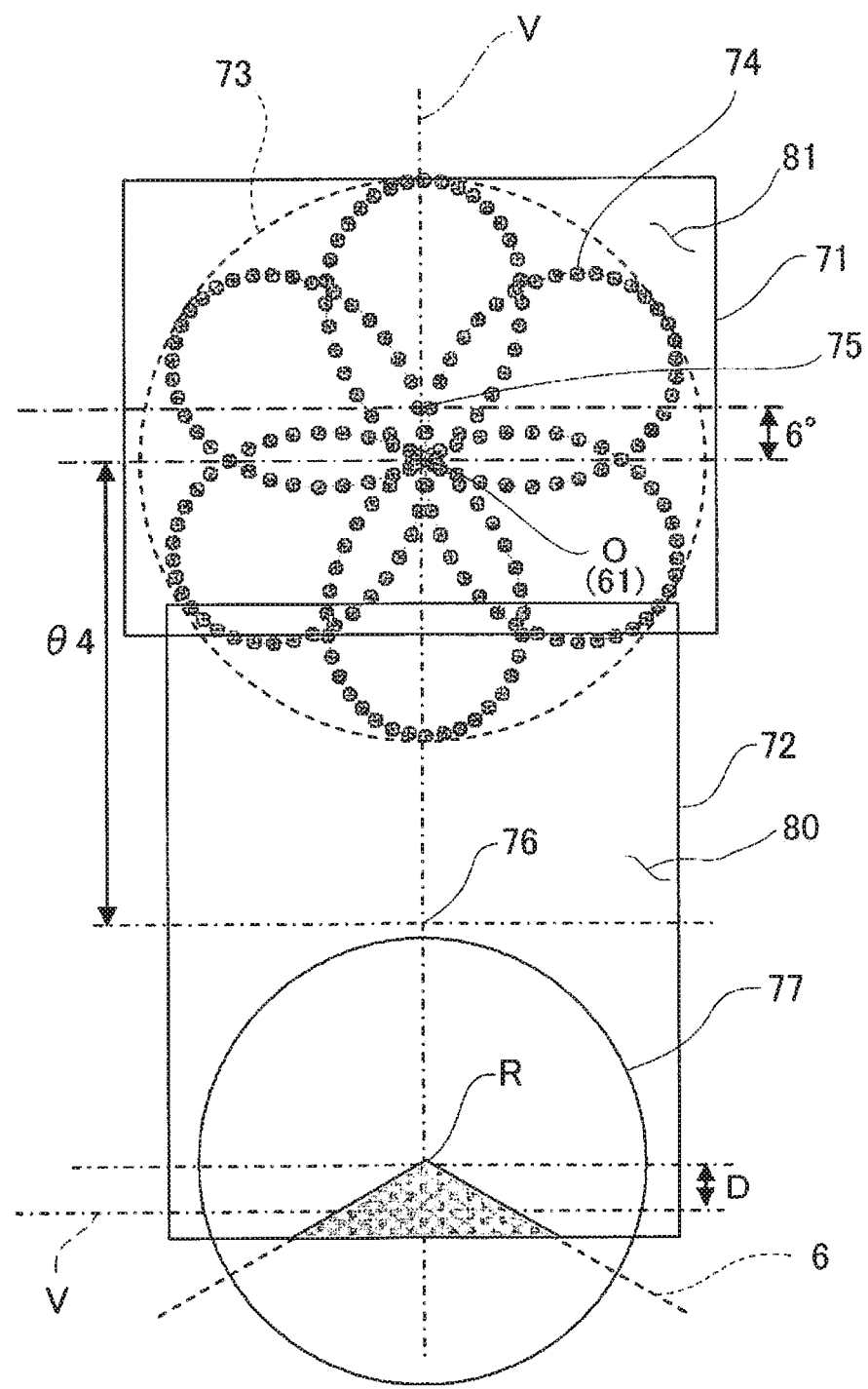
FIG. 3 is a drawing to show a relationship between images acquired by a measuring direction image pickup module and a lower image pickup module and a scan locus by the surveying instrument main body.

For instance, when the one optical prism in the optical prism 41 and the optical prism 42 is rotated in a forward direction at 17.5 Hz and the other optical prism is rotated at 5 Hz in an opposite direction, a flower petal-shaped two-dimensional closed loop scan pattern (flower petal pattern 74 (hypotrochoid curve)) as shown in FIG. 3 is obtained.

A description will be given on the lower image pickup module 5.

The lower image pickup module 5 is electrically connected to the surveying instrument main body 4, and image data acquired by the lower image pickup module 5 is inputted into the surveying instrument main body 4.

An image pickup of the lower image pickup module 5 is synchronously controlled with the image pickup of the measuring direction image pickup module 21 and the distance measurement of the distance measuring unit 24 by the image pickup control module 16. The lower image pickup module 5 is provided at an already-known position with respect to the machine center of the surveying instrument main body 4, and the distance between the lower image pickup module 5 and the lower end of the monopod 3 is also already-known.

Further, regarding the second image pickup optical axis 8 of the lower image pickup module 5, there is a known relationship in an angle between the second image pickup optical axis 8 and the reference optical axis "O" and in a position of an intersection between the reference optical axis "O" and the second image pickup optical axis 8, and the image data acquired by the lower image pickup module 5 is associated with the image as acquired by the measuring direction image pickup module 21 and the distance measurement data as measured by the distance measuring unit 24 and stored in the first storage module 15 by the arithmetic control module 14.

Figure 5:
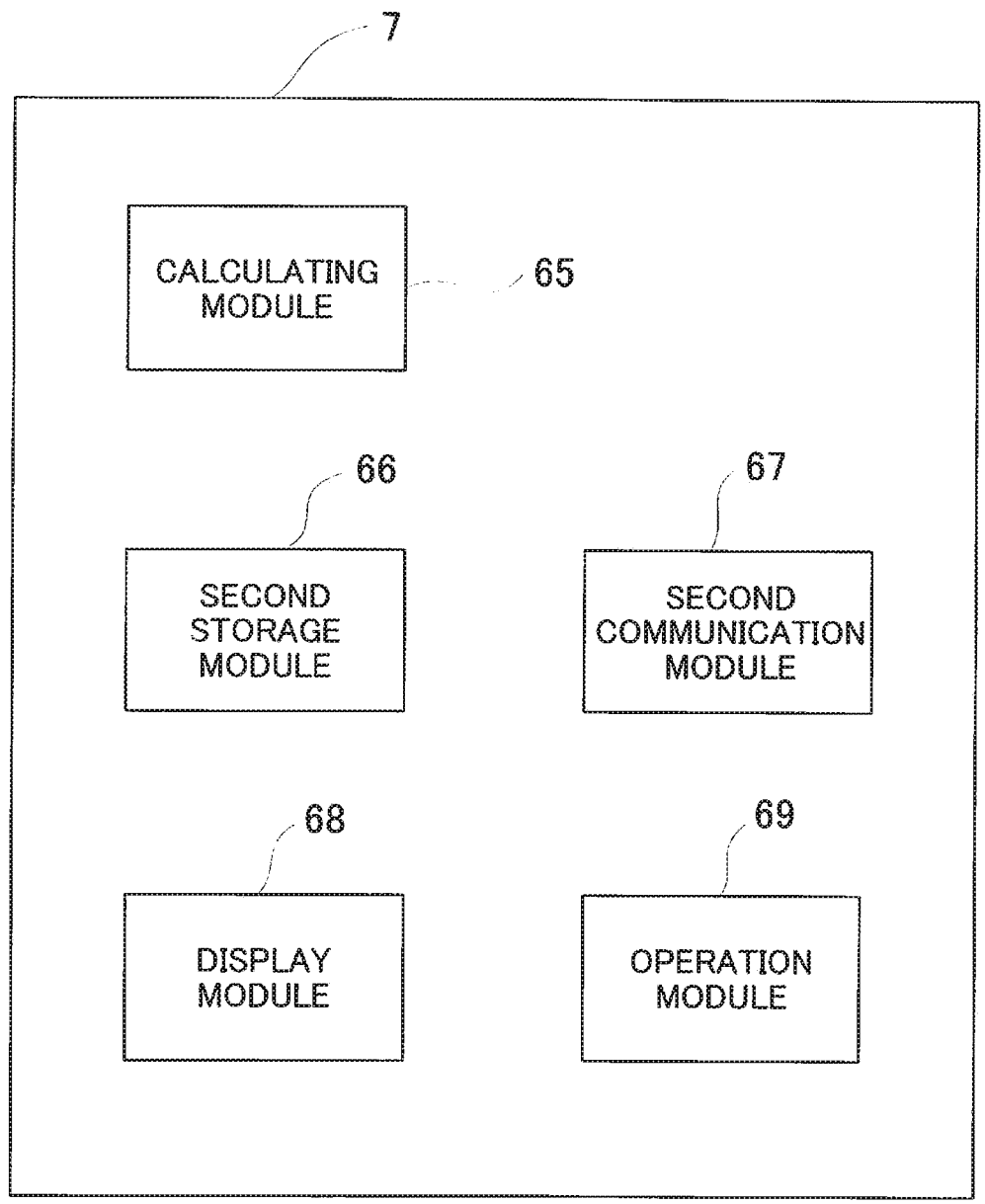
FIG. 5 is a schematical block diagram of an operation panel.

A description will be given on the operation panel 7 in brief by referring to FIG. 5.

The operation panel 7 may be provided in a fixed manner with respect to the monopod 3 as described above or may be attachable and detachable. Further, in a case where the operation panel 7 is attachable and detachable, the operation panel 7 may be removed from the monopod 3, and in a state of the operation panel 7 only, the worker may hold and operate the operation panel 7.

The operation panel 7 mainly includes a calculating module 65, a second storage module 66, the second communication module 67, the display module 68 and an operation module 69. It is to be noted that the display module 68 may be a touch panel, and the display module 68 may also serve as the operation module 69. Further, in a case where the display module 68 is made as the touch panel, the operation module 69 may be omitted. As the calculating module 65, a CPU specialized for this instrument or a general-purpose CPU is used, and the CPU executes programs stored in the second storage module 66 and performs a calculation, a processing and a control.

As the second storage module 66, a semiconductor memory, an HDD, a memory card and the like is used. Various types of programs are stored in the second storage module 66. These programs includes: a communication program for performing a communication with the surveying instrument main body 4, an image processing program for performing a processing such as a synthesizing of the image acquired by the lower image pickup module 5 and the image acquired by the measuring direction image pickup module 21, a display program for displaying the image acquired by the lower image pickup module 5, the image acquired by the measuring direction image pickup module 21 and a measurement information measured by the distance measuring unit 24 on the display module 68, a command creating program for creating a command for the surveying instrument main body 4 based on an information operated by the operation module 69 and other programs. Further, in the second storage module 66, the data such as the image data acquired by the lower image pickup module 5, the image data acquired by the measuring direction image pickup module 21, the measurement information measured by the distance measuring unit 24 and the like, may be stored.

The second communication module 67 communicates data such as the measurement data, the image data, the command and the like, with the image processing module 17 via the arithmetic control module 14 and the first communication module 18.

The display module 68 displays measurement results and the like such as a measurement state, a distance, a deflection angle and a reflection light amount of the surveying instrument main body 4, and also displays the images acquired by the lower image pickup module 5 and the measuring direction image pickup module 21 (the observation image 81) or the image as image processed by the image processing module 17. Further, the display module 68 can superimpose and display the image acquired by the measuring direction image pickup module 21 and the scan locus (the flower petal pattern 74). Further, the display module 68 may display an image which the image processing module 17 cuts out and enlarges a required range from the observation image 81 as a sighting image 82 (see FIG. 8A and FIG. 8B) around a desired point (tracking point 87 (see FIG. 8A and FIG. 8B) designated on the observation image 81.

Here, the sighting image 82 is an image around the tracking point 87 and also an image around the distance measuring optical axis 35 deflected by the optical axis deflector 19 (the distance measuring optical axis 35 coincides with the reference optical axis "O" when the distance measuring optical axis 35 is not deflected). The sighting image 82 is enlarged at a predetermined magnification (for instance, three times to 10 times) and displayed on the display module 68. The various commands such as a command regarding the measurement work and the like can be input from the operation module 69 to the surveying instrument main body 4. Further, a display of the observation image 81 and a display of the sighting image 82 can be switched from the operation module 69.

Further, a position of the sighting image 82 in the observation image 81 is fixed. That is, in a case where a position of the reference optical axis "O" of the observation image 81 changes, a position of the center of the sighting image 82 also changes.

As the operation panel 7, a smartphone or a tablet may be used, for instance. Further, the operation panel 7 may be used as a data collector.

Next, a description will be given on a measuring operation of the surveying instrument 1 by referring to FIG. 1, FIG. 2, FIG. 3, FIG. 4A, FIG. 4B and FIG. 5. It is to be noted that the following measuring operation is performed by the arithmetic control module 14 which executes the programs stored in the first storage module 15.

As a preparation for starting the measurement, the lower end of the monopod 3 is positioned at the reference point "R", and the monopod 3 is held by the worker. It is to be noted that the operation panel 7 remains in a state mounted on the monopod 3. Further, the surveying instrument 1 is installed in a condition where the lower image pickup module 5 and the measuring direction image pickup module 21 operate.

In a case where the reference optical axis "O" is directed toward the object to be measured 2, the monopod 3 is rotated around the lower end of the monopod 3, or the monopod 3 is tilted in the front, rear, left and right directions or spirally rotated. As shown in FIG. 3, the observation image 81 is displayed on the display module 68. The reference optical axis "O" is positioned 60 below with respect to the center of the observation image 81. A direction and a position of the reference optical axis "O" can be confirmed from the observation image 81. An inclination angle and a change in the inclination angle of the monopod 3 at this moment are detected by the attitude detector 20.

In a state where the direction of the reference optical axis "O" is determined (fixed), a measurable deflection range 73 (that is, a range where the distance measuring optical axis 35 can be deflected by the optical axis deflector 19) around the reference optical axis "O" can be confirmed on the observation image 81. The worker can designate an arbitrary point in the measurable range in the observation image 81 as a measuring point (object to be measured 2). By a designation of the object to be measured 2, the arithmetic control module 14 directs the distance measuring optical axis 35 toward the object to be measured 2 by using the optical axis deflector 19.

The distance measuring optical axis 35 is directed toward the object to be measured 2, the distance measuring light 33 is irradiated, and the measurement (a distance measurement, an angle measurement) of the object to be measured 2 is carried out. A direction of the distance measuring light 33, a distance measurement result and the like are displayed on the display module 68. Further, on the display module 68, the observation image 81, a frame outline 83 which shows a position of the sighting image 82 on the observation image 81 and the like are displayed. In a case where a detail of the sighting image 82 need to be confirmed, the sighting image 82 is enlargedly displayed.

In a case where the object to be measured 2 is changed or the surveying instrument 1 is moved, the measuring point can be again designated and the sighting image 82 can be created again from the observation image 81. On the other hand, the measuring point can be moved by tilting or rotating the monopod 3 while displaying the observation image 81 on the display module 68.

In a case where a sighting state of the distance measuring optical axis 35, that is, a state where the distance measuring optical axis 35 coincides with the object to the measured 2, is maintained, the measurement worker may hold the monopod 3, or the auxiliary leg 6 may be pulled out and the monopod 3 may be supported by the auxiliary leg 6.

By supporting the monopod 3 by the auxiliary leg 6, an inclination of the monopod 3 in the front-and-rear direction and the rotation around the lower end of the monopod 3 is limited and a support state of the surveying instrument 1 becomes stable.

It is to be noted that the tilt angle and the tilting direction of the surveying instrument 1 with respect to the horizontal are detected by the attitude detector 20 in real time and thus, the measurement result can be corrected in real time based on the detection result. Therefore, a leveling work for adjusting the surveying instrument 1 to the horizontal is not needed, and the fluctuation of the tilt angle caused by a slight swing or the like, which is generated by a holding of the monopod 3 by the worker, can be also corrected in real time.

Next, a description will be given on a detection of a rotation angle (horizontal rotation angle) in the horizontal direction around the lower end of the monopod 3 by referring to FIG. 3.

In FIG. 3, a reference numeral 71 denotes a first image acquiring range of the measuring direction image pickup module 21, and a reference numeral 81 denotes an observation image acquired in the a first image acquiring range 71. Further, a reference numeral 72 denotes a second image acquiring range of the lower image pickup module 5, and a reference numeral 80 denote a lower image acquired in the second image acquiring range 72. Further, a reference numeral 73 denotes a deflection range of the distance measuring optical axis 35 by the optical axis deflector 19 in the observation image 81 and the lower image 80, and a reference numeral 74 denotes a locus of a case where a distance measuring light is scanned in the flower petal pattern by the optical axis deflector 19 while irradiating the distance measuring light at plural times. Dots indicated in a locus of the flower petal pattern 74 show irradiation points of the distance measuring light at plural times. Further, a reference numeral 75 denotes an image center of the observation image 81, and a reference numeral 76 denotes an image center of the lower image 80 (the image center 76 coincides with the second image pickup optical axis 8).

Further, in FIG. 1, a reference character "θ1" denotes the field angle of the measuring direction image pickup module 21, a reference character "θ2" denotes the field angle of the lower image pickup module 5, and a reference character "θ3" denotes a scan range of the surveying instrument main body 4, respectively.

Further, in FIG. 3, an angle between the first image pickup optical axis 61 and the second image pickup optical axis 8 is set to 60°, for instance, and the reference optical axis "O" is tilted downward by 6°, for instance, with respect to the first image pickup optical axis 61. That is, "θ4" is 54°. Further, FIG. 3 shows a state where the monopod 3 is held by tilting rearward (direction separated away from the object to be measured 2) by 5°.

The second image pickup optical axis 8 is directed downward, and the second image acquiring range 72 is set so that the lower end of the monopod 3 is included. The drawing shows an example of the lower image 80 which has a range of approximately 80° and includes the reference point "R".

A circular image with a range of a predetermined radius around this reference point "R" is set a rotation detection image 77, and the rotation detection image 77 is acquired in real time.

The rotation detection image 77 at the start of the measurement is acquired, and the rotation detection image 77 is set as a rotation reference image.

In a case where a rotation angle (rotation angle around an axis of the monopod 3) after the start of the measurement is detected, a rotation change of the rotation detection image 77 between the rotation reference image and the rotation detection image 77 is detected with respect to the rotation reference image around the reference point "R" (that is, an image shift in the rotating direction), and the rotation angle is calculated based on the rotation change. The rotation angle is converted to a horizontal rotation angle around the vertical axis based on the detection result of the attitude detector 20. It is to be noted, by projection-converting the rotation detection image 77 to a horizontal image based on the detection result of the attitude detector 20 and detecting the horizontal rotation change, the horizontal rotation angle may be obtained.

Alternatively, the observation image 81 at the start of the measurement is acquired, and an image matching of the observation image 81 and the observation image 81 of a post-rotation is performed based on a feature point and the like. A horizontal angle between the observation image 81 and the observation image 81 of the post-rotation may be obtained based on a deviation of a position (the center of the observation image 81) of the reference optical axis "O" between both of the images at this moment, a distance measurement result with respect to the feature point and the like and the detection result of the attitude detector 20.

Next, as shown in FIG. 1, when the object to be measured 2 is measured by the surveying instrument main body 4, a slope distance to the object to be measured 2 is measured. Further, a deflection angle of the reference optical axis "O" (6° in FIG. 3) with respect to the image center 75 and a deflection angle of the distance measuring optical axis 35 with respect to the reference optical axis "O" are detected by the projecting direction detecting module 22. Further, the tilt angle of the surveying instrument main body 4 with respect to the horizontal is detected by the attitude detector 20, the tilt angle of the distance measuring optical axis 35 with respect to the horizontal is calculated, and a horizontal rotation angle change of the monopod 3 is detected from the rotation detection image 77 or the observation image 81.

The slope distance is corrected to a horizontal distance based on the tilt angle of the distance measuring optical axis 35 with respect to the horizontal, and a directional angle is calculated based on the horizontal distance. Since a length of the monopod 3 (distance from the lower end of the monopod 3 to the machine center of the surveying instrument main body 4) and the inclination of the monopod 3 with respect to the first image pickup optical axis 61 are already-known, three-dimensional coordinates of the object to be measured 2 with reference to the lower end of the monopod 3 (that is, the reference point "R") are obtained.

It is to be noted that calculations such as the calculation of the rotation angle, the calculation of the tilt angle of the distance measuring optical axis 35, the calculation of the horizontal distance and the like may be performed by the arithmetic control module 14 or may be performed by the calculating module 65.

In the above description, the measurement is performed with the same action as the action of the total station in a state where the distance measuring optical axis 35 is fixed at the measuring point, but the measurement can be likewise performed by using the surveying instrument 1 as a laser scanner.

As shown in FIG. 3, the optical axis deflector 19 can freely deflect the distance measuring optical axis 35 within a range of the deflection range 73. By controlling the rotations of the optical prism 41 and the optical prism 42, the scan with a locus of the flower petal pattern 74 can be performed. By irradiating the pulsed distance measuring light during a scan process, the distance measurement data (point cloud data) can be acquired along the locus of the flower petal pattern 74. Further, in case of increasing a distance measurement data density (point cloud data density), it would suffice if the flower petal pattern 74 is rotated around a center of the scan pattern at a predetermined angle in a circumferential direction each time the flower petal pattern 74 is scanned for one pattern. Further, the images are acquired by the measuring direction image pickup module 21 and the lower image pickup module 5 synchronously with the scan, respectively. Here, a case where the scan in the deflection range 73 (that is, a maximum deflection range (all deflection range) of the optical axis deflector 19) is performed will be referred to as a whole area scan.

Further, in a state where a scan in the all deflection range is carried out, by rotating the monopod 3 around the axis, or by spirally rotating the monopod 3 around the lower end, or by changing the inclination angle of the monopod 3, a scan center can be moved (a scan range can be moved). Thereby, the distance measurement data (point cloud data or scan data) in a desired direction and a desired range can be easily acquired.

In case of synthesizing the observation image 81 and the lower image 80, overlapped portions of both the images can be used. Alternatively, the scan is carried out in such a manner that a part of the locus of the flower petal pattern 74 is included in the lower image 80, and the observation image 81 and the lower image 80 can be immediately synthesized by using the distance measurement data along the locus of the flower petal pattern 74 in the observation image 81 and the distance measurement data along the locus of the flower petal pattern 74 in the lower image 80.

It is to be noted that, as the data along the locus which is used for synthesizing, the data along the locus, which is included in both the observation image 81 and the lower image 80 in common, may be used. Alternatively, the observation image 81 and the lower image 80 may be synthesized by using coordinate values of the data along the loci, which are individually included in the observation image 81 and the lower image 80.

When the observation image 81 is synthesized with the lower image 80, a wide-range synthesized image including the reference point "R" to the object to be measured 2 can be acquired, and it facilitates a confirmation of a measurement range and a measuring position and improves the workability. Further, when the observation image 81 or the synthesized image is associated with the data along the locus, which is acquired by a two-dimensional scan, an image with three-dimensional data can be acquired per each pixel.

When the rotations of the optical prism 41 and the optical prism 42 are controlled, the distance measuring light 33 can be scanned in various patterns. On the other hand, the distance measuring light 33 can be scanned only in a partial range of the deflection range 73. Here, a scan in the partial range of the deflection range 73 will be referred to as a local scan.

The local scan is carried out in, for instance, a range of the sighting image 82, and the point cloud data is acquired in the range of the sighting image 82.

Figure 6A:
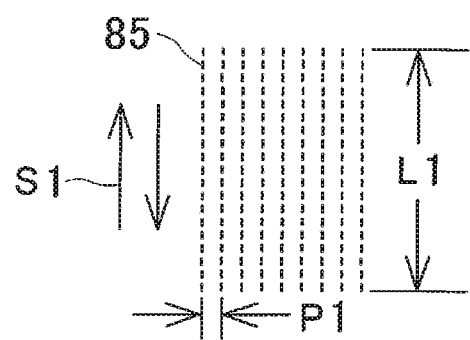
FIG. 6A and FIG. 6B are drawings to show an example of a local pattern.
Figure 6B:
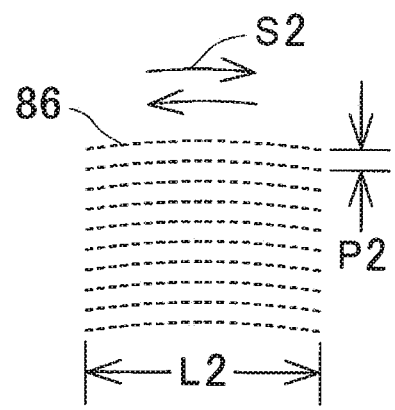

Examples of patterns in which the local scan is performed are shown in FIG. 6A and FIG. 6B. Besides, there are also a circular pattern, a pattern in a shape of a numeral 8 and other patterns.

A scan pattern 85 shown in FIG. 6A is acquired by integrally rotating the optical prisms 41 and 42 by a predetermined angle step "P1" per each linear scan shown in FIG. 4A. It is to be noted that, in FIG. 6A, a reference character "S1" denotes a scan direction.

A scan pattern 86 shown in FIG. 6B is acquired by setting a deflection angle of the distance measuring optical axis 35 by the optical prisms 41 and 42, then integrally rotating the optical prisms 41 and 42 by a predetermined angle, performing an arc scan in the circumferential direction and changing the deflection angle in a radial direction by a predetermined feed step "P2" per each arc scan. It is to be noted that, in FIG. 6B, a reference character "S2" denotes a scan direction.

Further, at the time of carrying out the local scan, in the range around the reference optical axis "O", an effective local scan cannot be acquired due to a structure of the optical axis deflector 19. Therefore, in case of carrying out the local scan, a center of the local scan is set at a position apart from the reference optical axis "O" by a required angle.

For instance, the local scan is programmed in such a manner that the center of the local scan does not fall within 5° from the reference optical axis "O". In a case where the local scan is carried out in the range of the sighting image 82, the center of the sighting image 82 is set in such a manner that a position apart from the reference optical axis "O" by 5° or more becomes an initial set position of the sighting image 82.

A monopole support type has a limit to the stability, and the monopod 3 fluctuates during the measurement. For this reason, the distance measuring optical axis 35 also always fluctuates during the measurement. In the present embodiment, a desired point in the observation image 81, for instance, a corner of a building is set as the tracking point 87.

Figure 7:
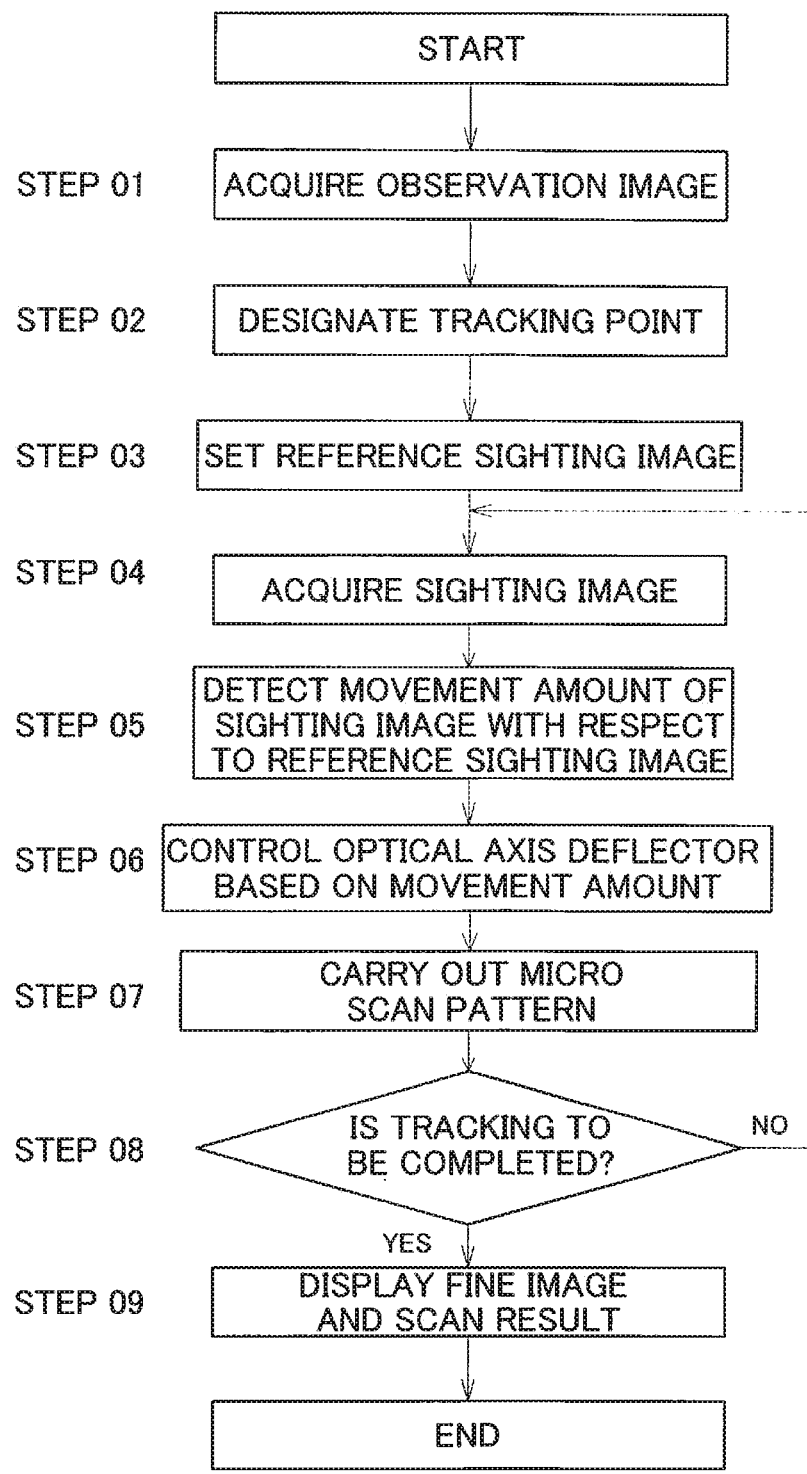
FIG. 7 is a flowchart to explain a tracking of a tracking point.

In the present embodiment, the tracking point 87 is designated in the observation image 81, and the sighting image 82 around the tracking point 87 is cut out. When a predetermined range in the sighting image 82 is scanned while performing the tracking in such a manner that the tracking point 87 is positioned at the center of the sighting image 82, it is possible to perform a stable measurement. A description will be given below on the tracking of the tracking point 87 by referring to a flowchart of FIG. 7, FIG. 8 and FIG. 9.

(Step 01) First, when the surveying instrument main body 4 is directed toward the object to be measured 2, the arithmetic control module 14 makes the measuring direction image pickup module 21 acquire the observation image 81 including a measuring portion 2a of the object to be measured 2. The center of the observation image 81 deviates from the reference optical axis "O" of the surveying instrument main body 4 by a known angle (6° in FIG. 3).

Figure 8A:
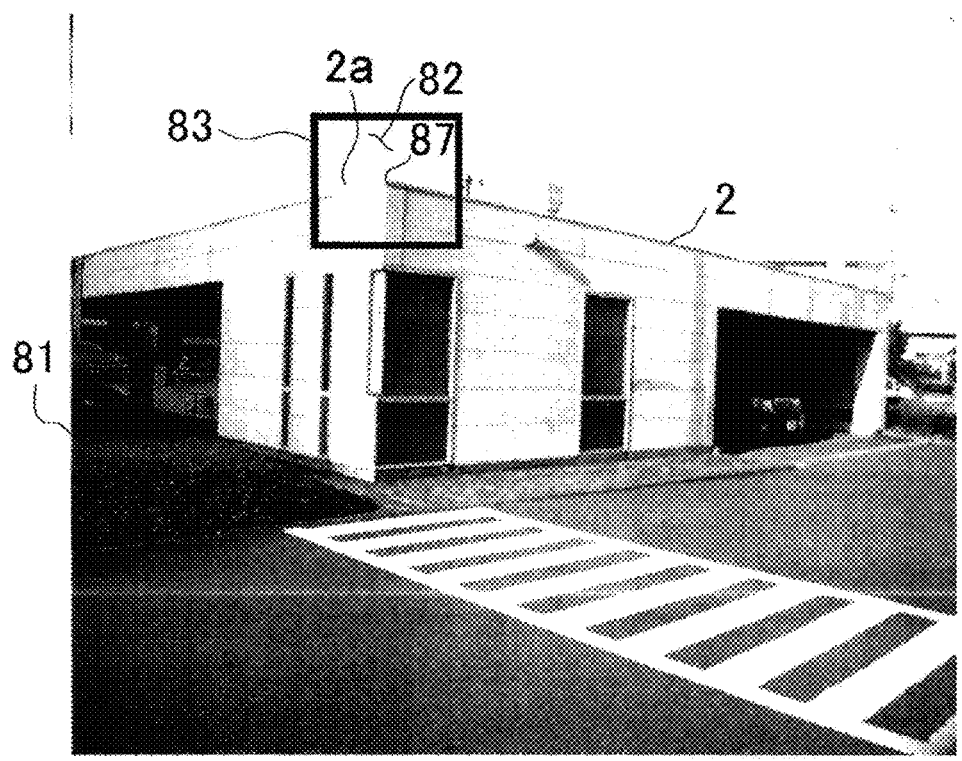
FIG. 8A is an explanatory drawing to show a relationship between an observation image and a frame outline showing a sighting image.
Figure 8B:
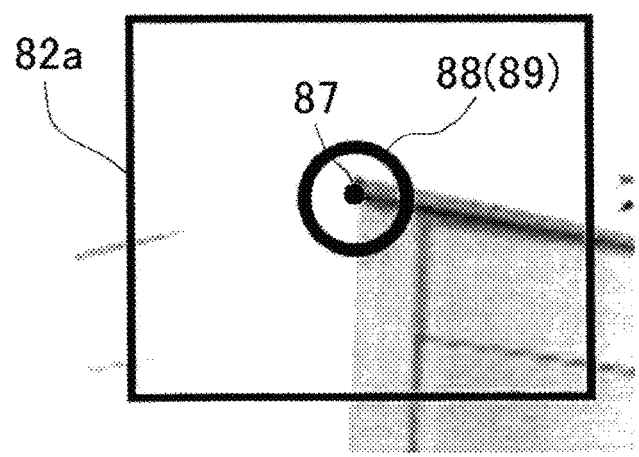
FIG. 8B is an explanatory drawing to show the sighting image.

(Step 02) The worker designates the predetermined tracking point 87 from the acquired observation image 81. As the tracking point 87, a point with the characteristics of the measuring portion 2a, for instance, a corner of a building is designated as shown in FIG. 8A. A position (coordinates) of the point designated in the observation image 81 with respect to the image center can be obtained. Further, a deflection angle of the tracking point 87 with respect to the reference optical axis "O" is calculated based on a known tilt angle between the first image pickup optical axis 61 and the reference optical axis "O".

(Step 03) When the tracking point 87 is designated, the arithmetic control module 14 cuts out the sighting image 82 with a predetermined range around the tracking point 87 from the observation image 81. The sighting image 82 at this moment is set as a reference sighting image 82a (see FIG. 8B). Further, an optical axis, which has a deflection angle with respect to the reference optical axis "O" and sights the tracking point 87, is determined as a sighting optical axis.

Next, the arithmetic control module 14 controls the optical axis deflector 19 and carries out the local scan around the tracking point 87 (sighting optical axis) with a micro scan pattern 88. The micro scan pattern 88 is, for instance, a scan pattern of a micro circular scan for scanning the distance measuring light 33 in a minute circular shape.

By carrying out the micro scan pattern 88, distance measurement data along a scan locus around the tracking point 87 (sighting optical axis) can be acquired. It is to be noted that, as a pattern shape of the micro scan pattern 88, a predetermined scan pattern such as a flower petal pattern, a linear pattern and the like can be applied besides the above-described micro circular pattern.

When the reference sighting image 82a is set and the micro scan pattern 88 in the reference sighting image 82a is carried out, the arithmetic control module 14 starts the tracking of the tracking point 87 with reference to the reference sighting image 82a.

(Step 04) When the tracking is started, the arithmetic control module 14 controls the image pickup control module 16 to acquire the new sighting image 82.

Even if the auxiliary leg 6 is used, the surveying instrument main body 4 supported by the monopod 3 is far from the perfect stability, and the sighting image 82 (that is, the sighting optical axis) unstably fluctuates. Therefore, there is a case where a deviation occurs between the reference sighting image 82a and the sighting image 82.

(Step 05) The arithmetic control module 14 carries out an image matching of the reference sighting image 82a and the sighting image 82 by, for instance, a correlation processing. By the image matching, a deviation amount of the sighting image 82 with respect to the reference sighting image 82a is calculated.

The deviation amount is a deviation amount of the center (the tracking point 87) of the micro scan pattern 88, which is carried out at the time of the acquisition of the reference sighting image 82a, with respect to the center of the sighting image 82, and the deviation amount and a deviating direction are obtained as a movement amount of the image. Further, when one pixel is enlarged to four pixels and the correlation processing is carried out, a movement amount (displacement amount) can be obtained with a sub-pixel accuracy.

It is to be noted that, in a case where a position of the surveying instrument main body 4 is not changed at the time of the acquisition of the sighting image 82, a positional deviation does not occur between both the images, and the sighting optical axis (center of the micro scan pattern 88) coincides with the tracking point 87 in the sighting image 82. On the other hand, in a case where the surveying instrument main body 4 is tilted or rotated, the positional deviation occurs between the reference sighting image 82a and the sighting image 82, and the tracking point 87 does not coincide with the sighting optical axis in the sighting image 82.

Each of FIG. 9A, FIG. 9B, FIG. 9C and FIG. 9D shows a position of a scan locus between the reference sighting image 82a and the sighting image 82 when the micro scan pattern 88 is carried out in a state where the positional deviation occurs between both the images. It is to be noted that, in FIG. 9A, FIG. 9B, FIG. 9C and FIG. 9D, each broken line 88 shows a scan locus in the reference sighting image 82a and each solid line 88 shows a scan locus in the sighting image 82.

Figure 9A:
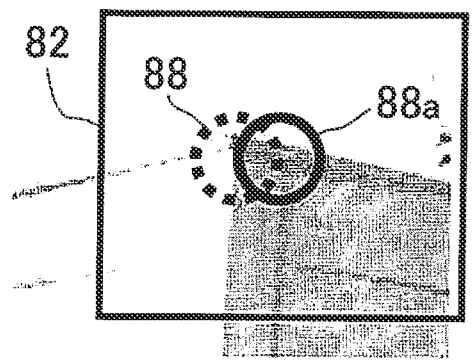
FIG. 9A, FIG. 9B, FIG. 9C and FIG. 9D are explanatory drawings to explain a positional deviation of a micro scan pattern when a sighting direction changes.
Figure 9B:
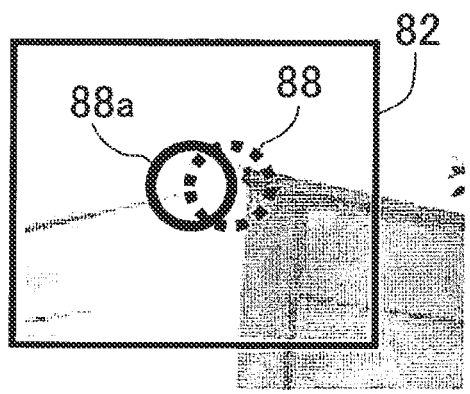
Figure 9C:
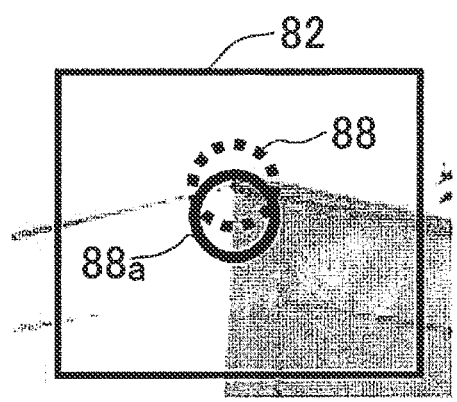
Figure 9D:
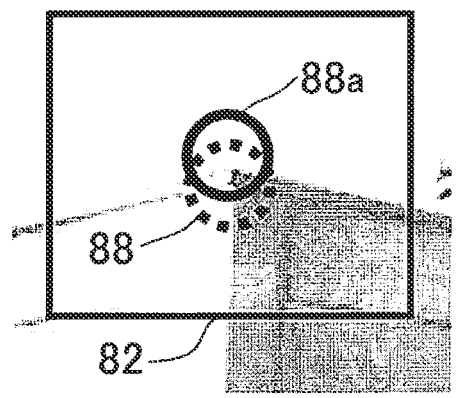

FIG. 9A shows a state where the sighting optical axis is directed toward the right side of the tracking point 87. Further, FIG. 9B shows a state where the sighting optical axis is directed toward the left side of the tracking point 87. Further, FIG. 9C shows a state where the sighting optical axis is directed toward the lower side of the tracking point 87. Further, FIG. 9D shows a state where the sighting optical axis is directed toward the upper side of the tracking point 87.

It is to be noted that the tracking points 87 included in the reference sighting image 82a and the sighting image 82 are positioned at the same position (the same coordinates), and an inclination of each image can be corrected to a vertical image (or a horizontal image) based on the detection result from the attitude detector 20. Therefore, by comparing the positions of a plurality of tracking points 87 between each sighting image 82, the movement amount between the images can be detected in a pixel unit or a smaller (sub-pixel) unit of the images, and also the movement amount can be obtained with high accuracy. Further, when the images are superimposed and averaged (integration processing) based on a detection result, the high definition of the images can be realized. Actually, one pixel is divided into four, shown and superimposed and averaged. Thereby, a fine image can be created with an accuracy equivalent to the number of pixels, which is four times a sum total of the pixels of the light emitter 27.

(Step 06) The arithmetic control module 14 controls the optical axis deflector 19 based on the movement amount and a moving direction calculated at (Step 05) in such a manner that the sighting optical axis coincides with the tracking point 87. That is, the arithmetic control module 14 controls the optical axis deflector 19 in such a manner that the tracking point 87 is always positioned at the center of the sighting image 82.

(Step 07) After making the sighting optical axis coincide with the tracking point 87, the arithmetic control module 14 carries out the micro scan pattern 88 again.

(Step 08) The arithmetic control module 14 repeats the processings of (Step 04) to (Step 07) until the point cloud data along the locus of the micro scan pattern 88 is sufficiently acquired. Further, when completing the local scan in the sighting image 82, the arithmetic control module 14 makes the surveying instrument main body 4 complete the tracking of the tracking point 87.

By performing the above-described operations in real time, it is possible to constantly match (that is, track) the sighting optical axis with the tracking point 87 even in a case where the surveying instrument main body 4 tilts and rotates.

(Step 09) When the tracking is completed, the arithmetic control module 14 displays a scan result (measurement result) obtained by the repeatedly carried out local scan and a fine image acquired by the integration processing of a plurality of the sighting images 82 on the display module 68.

Figure 10:
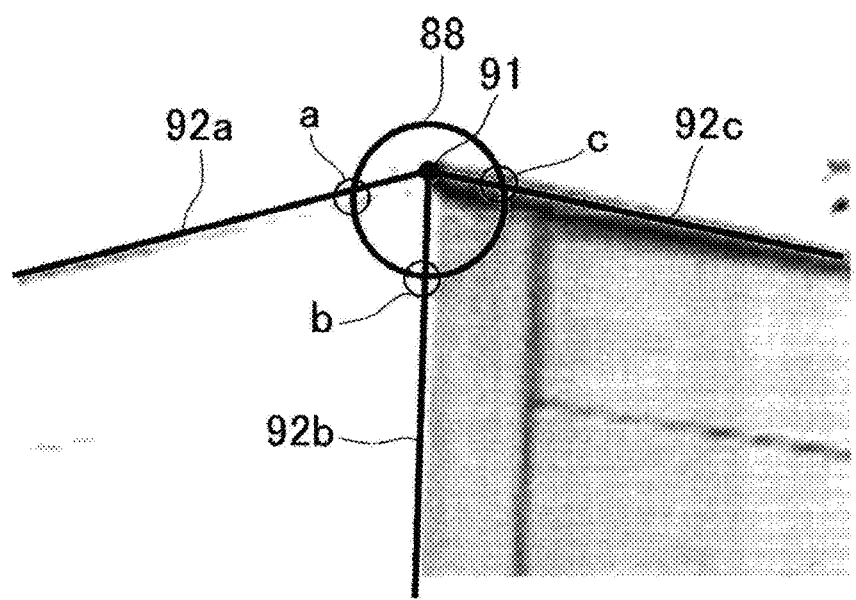
FIG. 10 is an explanatory drawing to explain a calculation of three-dimensional coordinates of a portion of an object to be measured.

Next, a description will be given on a calculation method for obtaining three-dimensional coordinates of a corner part 91 of the measuring portion 2a by referring to FIG. 10.

The arithmetic control module 14 performs an edge detection (ridge line detection) from the sighting image 82 by an image processing (for instance, an edge detection) and calculates tilts of extracted edge (ridge lines) 92a to 92c. Further, the arithmetic control module 14 obtains intersections of the ridge lines 92a to 92c and the micro scan pattern 88 (scan locus) and calculates three-dimensional coordinates of the intersections based on a measurement result obtained along the locus of the micro scan pattern 88. It is to be noted that, as the measurement result of the micro scan pattern 88, it is preferable to use a value obtained by averaging the measurement results acquired by repeatedly carrying out the local scan pattern.

Further, the arithmetic control module 14 calculates equations (tilts) of the ridge lines 92a to 92c based on the tilts of the ridge lines 92a to 92c and the three-dimensional coordinates of the intersections.

Further, the arithmetic control module 14 calculates an intersection of the ridge line 92a, the ridge line 92b and the ridge line 92c and can thus obtain the three-dimensional coordinates of the corner part 91.

As described above, in the present embodiment, the tracking point 87 is set in the observation image 81, the sighting image 82 around the tracking point 87 is cut out, and the tracking point 87 is tracked with the local scan in such a manner that the tracking point 87 is always positioned at the center of the sighting image 82.

Therefore, even if a sighting direction of the surveying instrument main body 4 changes due to the inclination or the rotation of the surveying instrument main body 4 during the local scan, the measurement around the tracking point 87 can be stably performed, and a measurement accuracy can be improved.

Further, in the present embodiment, the tracking point 87 is tracked based on the movement amount of the sighting image 82 with respect to the reference sighting image 82a. At the time of performing the tracking, the movement amount between the images can be detected in the pixel or smaller (sub-pixel) unit by dividing one pixel into four, and hence the tracking can be carried out with high accuracy.

Further, since one pixel is divided into four, the fine image can be created with an accuracy equivalent to the number of the pixels, which is four times a sum total of the pixels of the image pickup element 63, and hence the highly-accurate fine image can be inexpensively acquired.

Further, in the present embodiment, the lower image 80 including the lower end of the monopod 3 is acquired, the rotation detection image 77 is acquired based on the lower image 80, and a rotation angle of the surveying instrument main body 4 is obtained based on a rotation change between the rotation detection image 77 of the pre-rotation and the post-rotation.

Therefore, since the rotation angle of the surveying instrument main body 4 can be detected without additionally providing a rotation angle detector such as an encoder and the like, the instrument configuration of the surveying instrument main body 4 can be simplified, and a manufacturing cost can be reduced.

Further, in the present embodiment, based on the distance measurement result by the distance measuring unit 24, the detection result of the projecting direction detecting module 22 and the detection result of the attitude detector 20, the three-dimensional coordinates of the object to be measured 2 with reference to an installation position of the surveying instrument main body 4 can be obtained. Therefore, it is not necessary to vertically install the surveying instrument main body 4, an installation time can be reduced, and no skill is required, and hence the surveying instrument 1 can be easily installed in a short time. Further, even in case of frequently changing a direction and a position of the surveying instrument main body 4, the measurement can be easily performed in a short time.

It is to be noted that, in the present embodiment, the description has been given on the case where the sighting image 82 around the set tracking point 87 is cut out and the local scan is performed in the sighting image 82 while tracking the tracking point 87. On the other hand, the tracking point 87 may be set in the observation image 81, and the tracking point 87 may be tracked while performing the whole area scan in the observation image 81 in such a manner that the tracking point 87 coincides with the reference optical axis "O".

Further, in the present embodiment, the micro scan pattern 88 is formed by the micro circular scan, but the micro scan pattern 88 is not limited to the circular shape. For instance, the micro scan pattern 88 may be formed by a scan in a shape of a numeral 8, a raster scan or any other scan patterns.

Further, in the present embodiment, the tracking point 87 is tracked in such a manner that the tracking point 87 is always positioned at the center of the sighting image 82, but the micro scan pattern 88, which is carried out at the time of acquiring the reference sighting image 82a, may be determined as a reference micro scan pattern 89, and the tracking point 87 may be tracked in such a manner that the tracking point 87 is positioned within the reference micro pattern 89.

The invention claimed is:

1. A surveying instrument comprising a monopod installed on a reference point, a surveying instrument main body which is provided at a known distance from a lower end of said monopod and at a known angle with respect to an axis of said monopod and has a reference optical axis and an operation panel which is provided on said monopod and has a display module, wherein said surveying instrument main body includes a distance measuring unit configured to irradiate a distance measuring light, to receive a reflected distance measuring light and to measure a distance to an object to be measured, an optical axis deflector configured to deflect said distance measuring light with respect to said reference optical axis, a measuring direction image pickup module which includes said object to be measured and is configured to acquire an observation image in a predetermined relationship with said reference optical axis and an arithmetic control module configured to make said distance measuring unit perform a distance measurement along a predetermined scan pattern, and wherein said arithmetic control module is configured to continuously cut out sighting images around a tracking point set in said observation image, to set a first cutout sighting image as a reference sighting image, to calculate a movement amount of a subsequent sighting image with respect to said reference sighting image by an image matching of said reference sighting image and said subsequent sighting image and to control said optical axis deflector based on a calculation result in such a manner that said tracking point is positioned at a center of said subsequent sighting image.

2. The surveying instrument according to claim 1, wherein said arithmetic control module is configured to carry out a micro scan pattern around said tracking point each time said arithmetic control module controls said optical axis deflector in such a manner that said tracking point is positioned at the center of said subsequent sighting image.

3. The surveying instrument according to claim 2, wherein said micro scan pattern is a minute circular scan pattern.

4. The surveying instrument according to claim 3, wherein said arithmetic control module is configured to superimpose and average each of said subsequent sighting images based on a position of said tracking point in said subsequent sighting images and to create a fine image.

5. The surveying instrument according to claim 3, wherein said arithmetic control module is configured to extract a plurality of ridge lines of said object to be measured by an image processing, to calculate tilts of said plurality of ridge lines, to calculate three-dimensional coordinates of intersections of said plurality of ridge lines and said micro scan pattern and to calculate three- dimensional coordinates of a corner part of said object to be measured based on the tilts of said plurality of ridge lines and said three-dimensional coordinates of said intersections.

6. The surveying instrument according to claim 3, further comprising a lower image pickup module which is provided at a known position with respect to said surveying instrument main body and has a known relationship with respect to said reference optical axis, wherein said lower image pickup module has a lower image pickup optical axis directed downward and is configured to acquire a lower image including the lower end and a periphery of said monopod, and wherein said arithmetic control module is configured to obtain a displacement between said lower images of a pre-rotation and a post-rotation accompanying with a rotation around the axis of said monopod and to calculate a rotation angle of said surveying instrument main body around said reference point based on said displacement.

7. The surveying instrument according to claim 2, wherein said arithmetic control module is configured to superimpose and average each of said subsequent sighting images based on a position of said tracking point in said subsequent sighting images and to create a fine image.

8. The surveying instrument according to claim 7, wherein said arithmetic control module is configured to extract a plurality of ridge lines of said object to be measured by an image processing, to calculate tilts of said plurality of ridge lines, to calculate three-dimensional coordinates of intersections of said plurality of ridge lines and said micro scan pattern and to calculate three- dimensional coordinates of a corner part of said object to be measured based on the tilts of said plurality of ridge lines and said three-dimensional coordinates of said intersections.

9. The surveying instrument according to claim 7, further comprising a lower image pickup module which is provided at a known position with respect to said surveying instrument main body and has a known relationship with respect to said reference optical axis, wherein said lower image pickup module has a lower image pickup optical axis directed downward and is configured to acquire a lower image including the lower end and a periphery of said monopod, and wherein said arithmetic control module is configured to obtain a displacement between said lower images of a pre-rotation and a post-rotation accompanying with a rotation around the axis of said monopod and to calculate a rotation angle of said surveying instrument main body around said reference point based on said displacement.

10. The surveying instrument according to claim 2, wherein said arithmetic control module is configured to extract a plurality of ridge lines of said object to be measured by an image processing, to calculate tilts of said plurality of ridge lines, to calculate three-dimensional coordinates of intersections of said plurality of ridge lines and said micro scan pattern and to calculate three- dimensional coordinates of a corner part of said object to be measured based on the tilts of said plurality of ridge lines and said three-dimensional coordinates of said intersections.

11. The surveying instrument according to claim 10, further comprising a lower image pickup module which is provided at a known position with respect to said surveying instrument main body and has a known relationship with respect to said reference optical axis, wherein said lower image pickup module has a lower image pickup optical axis directed downward and is configured to acquire a lower image including the lower end and a periphery of said monopod, and wherein said arithmetic control module is configured to obtain a displacement between said lower images of a pre-rotation and a post-rotation accompanying with a rotation around the axis of said monopod and to calculate a rotation angle of said surveying instrument main body around said reference point based on said displacement.

12. The surveying instrument according to claim 2, further comprising a lower image pickup module which is provided at a known position with respect to said surveying instrument main body and has a known relationship with respect to said reference optical axis, wherein said lower image pickup module has a lower image pickup optical axis directed downward and is configured to acquire a lower image including the lower end and a periphery of said monopod, and wherein said arithmetic control module is configured to obtain a displacement between said lower images of a pre-rotation and a post-rotation accompanying with a rotation around the axis of said monopod and to calculate a rotation angle of said surveying instrument main body around said reference point based on said displacement.

13. The surveying instrument according to claim 1, further comprising a lower image pickup module which is provided at a known position with respect to said surveying instrument main body and has a known relationship with respect to said reference optical axis, wherein said lower image pickup module has a lower image pickup optical axis directed downward and is configured to acquire a lower image including the lower end and a periphery of said monopod, and wherein said arithmetic control module is configured to obtain a displacement between said lower images of a pre-rotation and a post-rotation accompanying with a rotation around the axis of said monopod and to calculate a rotation angle of said surveying instrument main body around said reference point based on said displacement.

* * * * *